United States Patent
Barton et al.

(10) Patent No.: US 10,208,154 B2
(45) Date of Patent: Feb. 19, 2019

(54) FORMULATIONS FOR CHEMICAL MECHANICAL POLISHING PADS AND CMP PADS MADE THEREWITH

(71) Applicant: Rohm and Haas Electronic Materials CMP Holdings, Inc., Newark, DE (US)

(72) Inventors: Bryan E. Barton, Lincoln University, PA (US); Michael E. Mills, Midland, MI (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 15/365,369

(22) Filed: Nov. 30, 2016

(65) Prior Publication Data

US 2018/0148537 A1  May 31, 2018

(51) Int. Cl.
| | |
|---|---|
| *B24B 37/00* | (2012.01) |
| *C08G 18/66* | (2006.01) |
| *C08G 18/48* | (2006.01) |
| *B24B 37/20* | (2012.01) |
| *C08G 18/12* | (2006.01) |
| *C08G 18/76* | (2006.01) |

(52) U.S. Cl.
CPC .......... *C08G 18/6681* (2013.01); *B24B 37/20* (2013.01); *C08G 18/12* (2013.01); *C08G 18/4829* (2013.01); *C08G 18/7671* (2013.01)

(58) Field of Classification Search
CPC ............ C08G 18/6681; C08G 18/7671; C08G 18/4829; B24B 37/20
See application file for complete search history.

(56) References Cited

U.S. PATENT DOCUMENTS

| | | | |
|---|---|---|---|
| 7,169,030 B1 | 1/2007 | Kulp | |
| 2005/0176912 A1* | 8/2005 | Shin | C08G 18/10 528/44 |
| 2006/0058408 A1* | 3/2006 | Sam | C08G 18/10 521/155 |
| 2008/0132594 A1* | 6/2008 | Iwase | C08G 18/4072 521/98 |
| 2010/0317263 A1 | 12/2010 | Hirose et al. | |
| 2011/0256817 A1 | 10/2011 | Fukuda et al. | |
| 2012/0279138 A1 | 11/2012 | Fukuda et al. | |
| 2013/0012105 A1 | 1/2013 | Ito et al. | |
| 2014/0120809 A1* | 5/2014 | Qian | C09G 1/02 451/59 |
| 2015/0375362 A1 | 12/2015 | Qian et al. | |
| 2016/0176022 A1 | 6/2016 | Qian et al. | |
| 2016/0375543 A1 | 12/2016 | Qian et al. | |
| 2016/0375545 A1 | 12/2016 | Qian et al. | |
| 2016/0375550 A1 | 12/2016 | Tong et al. | |
| 2016/0375552 A1 | 12/2016 | Qian et al. | |
| 2016/0375553 A1 | 12/2016 | Veneziale et al. | |

* cited by examiner

*Primary Examiner* — Michael L Leonard
(74) *Attorney, Agent, or Firm* — Andrew Merriam; Blake T. Bierderman

(57) ABSTRACT

A two component composition for making chemical mechanical polishing pad for polishing a semiconductor substrate is provided comprising a liquid aromatic isocyanate component having an unreacted isocyanate (NCO) concentration of from 15 to 40 wt. %, based on the total solids weight of the aromatic isocyanate component, such as methylene di(phenylisocyanate) (MDI), a liquid polyol component of a polyol having a polyether backbone and having from 5 to 7 hydroxyl groups per molecule, and a curative of one or more polyamine or diamine, wherein the reaction mixture comprises 50 to 65 wt. % of hard segment materials, based on the total weight of the reaction mixture. The composition when mixed cured to form a polyurethane reaction product. Also provided are CMP polishing pads made from the polyurethane reaction product by spraying the composition into a mold.

8 Claims, No Drawings

FORMULATIONS FOR CHEMICAL MECHANICAL POLISHING PADS AND CMP PADS MADE THEREWITH

The present invention relates to compositions for making chemical mechanical planarization (CMP) polishing pads and the pads made from them. More particularly, the present invention relates to compositions for making CMP polishing pads comprising a liquid aromatic isocyanate component and a liquid polyol component comprising from 32 to 50 wt. % or, preferably, from 40 to 50 wt. %, based on the total solids weight of the composition, of one or more polyfunctional polyol comprising a polyether backbone and having from 5 to 7 hydroxyl groups or, preferably, 6 hydroxyl groups, and the CMP polishing pads made therefrom.

In a CMP process, a polishing pad in combination with a polishing solution, such as an abrasive-containing polishing slurry and/or an abrasive-free reactive liquid, removes excess material in a manner that planarizes or maintains flatness of a semiconductor, optical or magnetic substrate. There is an ongoing need for CMP polishing pads that have increased removal rate in combination with acceptable defectivity and layer uniformity or planarization performance. However, there has remained in the industry a performance tradeoff between planarization efficiency (PE) and defectivity with greater PE resulting in more defects.

Improve tensile modulus is a key driver for improved PE. One way to improve tensile modulus would be to make a polyurethane (PU) pad matrix with isocyanate-terminated urethane prepolymers. However, the traditional methods to prepare CMP pads employing prepolymers involve casting or rapid injection molding; in such methods, the reactivity of the PU forming reactants has to be limited so that the mold can be filled before viscosity builds too high while remaining high enough to form pads having sufficient hardness. Thus, the isocyanate contents of the PU forming reactants is limited, leaving little room to formulate a flowable prepolymer that gives acceptable tensile modulus. Further, tensile modulus must be satisfied while retaining an acceptable elongation-to-break which is generally decreased in compositions that form a higher tensile moduli.

U.S. patent publication no. US20100317263A1, to Hirose et al. discloses methods of making CMP polishing pads of durable foams with interconnected cells via mechanical foaming or frothing. The formulations for the CMP polishing pads comprise a two component mixture of an isocyanate component which is 90% by weight or more of diphenylmethane diisocyanate, aka methylene di(phenyl isocyanate) (MDI), and an active hydrogen component of which 15 to 40% by weight is a compound having three functional groups that react with an isocyanate group and 60% by weight of a polycaprolactone polyol. In the mixtures of Hirose, if less then the required amount of the active hydrogen component is polycaprolactone polyol or a compound having three functional groups that react with an isocyanate groups, then the wet compressibility of pads made therefrom is too low and polishing suffers. Further, the compound having three functional groups that react with an isocyanate group has to have three such functional groups to reduce swelling in the wet condition and to avoid generation of scratches during polishing. See [0052].

The present inventors have sought to solve the problem of providing a more flexible formulation window for making chemical mechanical polishing pads that have improved bulk tensile modulus while retaining both desirable elongation and acceptable defectivity performance.

STATEMENT OF THE INVENTION

A. In accordance with the present invention, solvent free and substantially water free two component formulations comprise a liquid aromatic isocyanate component having an unreacted isocyanate (NCO) concentration of from 15 to 40 wt. %, or, preferably, from 17.5 to 35 wt. %, based on the total solids weight of the aromatic isocyanate component, such as an aromatic diisocyanate, an aromatic isocyanurate, a linear isocyanate-terminated urethane prepolymer having a hard segment weight fraction of 84 to 100 wt. % or, preferably, from 90 to 100 wt. %, or mixtures thereof, a liquid polyol component of a polyol having a polyether backbone and having from 5 to 7 or, preferably, 6 hydroxyl groups per molecule, and a curative of one or more polyamine or diamine, preferably, aromatic diamine, wherein the reaction mixture comprises 50 to 65 wt. % or, preferably, from 50 to 62.5 wt. % of hard segment materials, based on the total weight of the reaction mixture, and, further wherein, the wherein, the stoichiometric ratio of the sum of the total moles of amine ($NH_2$) groups and the total moles of hydroxyl (OH) groups in the reaction mixture to the total moles of unreacted isocyanate (NCO) groups in the reaction mixture ranges from 0.8:1.0 to 1.1:1.0, or, preferably, from 0.85:1.0 to 1.1:1.0, or, preferably, from 0.90:1.0 to 1.0:1.0.

1. In accordance with the present invention, solvent free and substantially water free two-component reaction mixtures for making chemical mechanical planarization (CMP) polishing pads comprise (i) a liquid aromatic isocyanate component of one or more diisocyanate, triisocyanate, isocyanurate or isocyanate-terminated urethane prepolymer compound having an unreacted isocyanate (NCO) concentration of from 15 to 40 wt. %, or, preferably, from 17.5 to 35 wt. %, based on the total solids weight of the aromatic isocyanate component, such as an aromatic diisocyanate chosen from methylene diphenyl diisocyanate (MDI); toluene diisocyanate (TDI); napthalene diisocyanate (NDI); paraphenylene diisocyanate (PPDI); or o-toluidine diisocyanate (TODD; a modified diphenylmethane diisocyanate, such as a carbodiimide-modified diphenylmethane diisocyanate, an allophanate-modified diphenylmethane diisocyanate, a biuret-modified diphenylmethane diisocyanate; an aromatic isocyanurate, such as the isocyanurate of MDI; a linear isocyanate-terminated urethane prepolymer having a hard segment weight fraction of 84 to 100 wt. % or, preferably, from 90 to 100 wt. %, for example, a linear isocyanate-terminated urethane prepolymer of MDI or an MDI dimer with one or more isocyanate extenders; a mixture of one or more aromatic diisocyanates and one or more aromatic triisocyanates, such as an isocyanurate, for example, an isocyanurate of MDI or TDI; and a mixture of one or more aromatic diisocyanates and one or more aromatic monoisocyanates, such as phenylisocyanate, preferably, MDI or a linear isocyanate-terminated urethane prepolymer of MDI or an MDI dimer with ethylene glycol, propylene glycol, dipropylene glycol, or tripropylene glycol; and, separately, (ii) a liquid polyol component comprising from 32 to 50 wt. % or, preferably, from 35 to 45 wt. %, based on the total solids weight of the reaction mixture, of one or more polyfunctional polyol comprising a polyether backbone, preferably, polyoxyethylene or polyoxyethylene-co-polyoxypropylene, and having from 5 to 7 hydroxyl groups or, preferably, 6 hydroxyl groups, such as a polyalkoxy polyol or a polyethoxylated polyol having from 5 to 7 hydroxyl groups, for example, a polyethoxylated polyether polyol having 6 hydroxyl groups, such as an ethylene oxide capped propylene oxide polyol, a polyethoxylated glycerol end capped polypropylene glycol, a polyethoxylated erythritol end capped polypropylene glycol, or polyalkoxylated sugar alcohols, such as a polyethoxylated sorbitol, or a polyethoxylated-propoxylated sorbitol having ethoxy hydroxyl groups; and a curative of one or more polyamine or diamine, preferably, aromatic diamine, or an aromatic amine greater than 2 amine functional groups, wherein the polyol component can comprise up to 15 wt. % or, preferably, up to 10 wt. %, based on the total weight of the polyol component, of one or more polyols, such as polyether polyols, like polypropylene glycol (PPG), polytetramethylene ether glycol (PTMEG); glycols, such as ethylene or propylene glycol; diglycols, such as dipropylene glycol; or mixtures thereof wherein the reaction mixture comprises 50 to 65 wt. % or, preferably, from 50 to 62.5 wt. % of hard segment materials, based on the total weight of the reaction mixture; and, further wherein, the stoichiometric ratio of the sum of the total moles of amine ($NH_2$) groups and the total moles of hydroxyl (OH) groups in the reaction mixture to the total moles of unreacted isocyanate (NCO) groups in the reaction mixture ranges from 0.8:1.0 to 1.1:1.0, or, preferably, from 0.85:1.0 to 1.1:1.0, or, preferably, from 0.90:1.0 to 1.0:1.0.

2. In accordance with the solvent free and substantially water free reaction mixtures of the present invention as set forth in item 1, above, wherein the (i) aromatic isocyanate component and the (ii) polyol component are combined to cure upon mixing.

3. In accordance with the reaction mixture of the present invention as in any one of items 1 or 2, above, wherein the one or more isocyanate extenders are chosen from ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

4. In accordance with the reaction mixture of the present invention as in any one of items 1, 2 or 3, above, wherein the curative is a polyamine chosen from 4,4'-methylene-bis(3-chloro-2,6-diethylaniline); diethyl toluene diamines; tert-butyl toluene diamines, such as 5-tert-butyl-2,4- or 3-tert-butyl-2,6-toluenediamine; chlorotoluenediamines; dimethylthio-toluene diamines; 1,2-bis(2-aminophenylthio) ethane, trimethylene glycol di-p-amino-benzoate; tert-amyl toluenediamines, such as 5-tert-amyl-2,4- and 3-tert-amyl-2,6-toluenediamine; tetramethyleneoxide di-p-aminobenzoate; (poly)propyleneoxide di-p-aminobenzoates; chloro diaminobenzoates; methylene dianilines, such as 4,4'-methylene-bis-aniline; isophorone diamine; 1,2-diaminocyclohexane, bis(4-aminocyclohexyl)methane, 4,4'-diaminodiphenyl sulfone, m-phenylenediamine; xylene diamines; 1,3-bis(aminomethyl cyclohexane); and mixtures thereof, preferably, chlorotoluenediamines or dimethylthio-toluene diamines, such as dimethylthiotoluenediamine (DMTDA) and diethyltoluenediamine (DETDA) and N,N'-dialkylaminodiphenylmethane.

5. In accordance with another aspect of the present invention, chemical mechanical (CMP) polishing pads for polishing a substrate chosen from at least one of a magnetic substrate, an optical substrate and a semiconductor substrate comprise a polishing layer adapted for polishing the substrate which is a polyurethane reaction product of a two component reaction mixture comprising (i) a liquid aromatic isocyanate component of one or more diisocyanate, triisocyanate, isocyanurate or isocyanate-terminated urethane prepolymer compound having an unreacted isocyanate (NCO) concentration of from 15 to 40 wt. %, or, preferably, from 17.5 to 35 wt. %, based on the total weight of the aromatic isocyanate component, such as an aromatic diisocyanate, for example, methylene diphenyl diisocyanate (MDI), toluene diisocyanate (TDI); a modified diphenylmethane diisocyanate, such as a carbodiimide-modified diphenylmethane diisocyanate, an allophanate-modified diphenylmethane diisocyanate, a biuret-modified diphenylmethane diisocyanate, and a linear isocyanate-terminated urethane prepolymer having a hard segment weight fraction of 84 to 100 wt. % or, preferably, from 90 to 100 wt. %, for example, a linear isocyanate-terminated urethane prepolymer of MDI or an MDI dimer with one or more isocyanate extenders; a mixture of one or more aromatic diisocyanates and one or more aromatic triisocyanates, such as an isocyanurate, for example, an isocyanurate of MDI or TDI; or a mixture of one or more aromatic diisocyanates and one or more aromatic monoisocyanates, such as phenylisocyanate, preferably, MDI or a linear isocyanate-terminated urethane prepolymer of MDI, or an MDI dimer with ethylene glycol, propylene glycol or dipropylene glycol; and, (ii) a liquid polyol component comprising from 32 to 50 wt. % or, preferably, from 35 to 45 wt. %, based on the total weight of the reaction mixture, of one or more polyfunctional polyol comprising a polyether backbone and having from 5 to 7 hydroxyl groups or, preferably, 6 hydroxyl groups, such as a polyethoxylated polyol having from 5 to 7 hydroxyl groups, for example, a polyethoxylated polyether polyol having 6 hydroxyl groups, such as an ethylene oxide capped propylene oxide polyol, a polyethoxylated glycerol end capped polypropylene glycol, a polyethoxylated erythritol end capped polypropylene glycol, or a polyalkxoylated sugar alcohol, such as a polyethoxylated sorbitol, or a polyethoxylated-propoxylated sorbitol having ethoxy hydroxyl groups; and a curative of one or more polyamine or diamine, preferably, aromatic diamine or an aromatic amine greater than 2 amine functional groups; wherein the polyol component can comprise up to 15 wt. % or, preferably, up to 10 wt. %, based on the total weight of the polyol component, of one or more polyols, such as polyether polyols, like polypropylene glycol (PPG), polytetramethylene ether glycol (PTMEG); glycols, such as ethylene or propylene glycol; diglycols, such as dipropylene glycol; or mixtures thereof, wherein the reaction mixture comprises 50 to 65 wt. % or, preferably, from 50 to 62.5 wt. % of hard segment materials, based on the total weight of the reaction mixture; and, further wherein, the stoichiometric ratio of the sum of the total moles of amine ($NH_2$) groups and the total moles of hydroxyl (OH) groups) in the reaction mixture to the total moles of unreacted isocyanate (NCO) groups in the reaction mixture ranges from 0.8:1.0 to 1.1:1.0, or, preferably, from 0.85:1.0 to 1.1:1.0, or, preferably, from 0.90:1.0 to 1.0:1.0.

6. In accordance with the chemical mechanical polishing pad of present invention as in item 5, above, wherein the one or more isocyanate extenders are chosen from ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

7. In accordance with the chemical mechanical polishing pad of present invention as in any one of items 5 or 6, above, wherein the polishing pad or polishing layer has a density of from 0.5 to 1.15 g/mL or, preferably, from 0.7 to 0.95 g/mL.

8. In accordance with the chemical mechanical polishing pad of the present invention as in any one of items 5, 6, or 7, above, wherein the curative is a polyamine chosen from 4,4'-methylene-bis(3-chloro-2,6-diethylaniline); diethyl toluene diamines; tert-butyl toluene diamines, such as 5-tert-butyl-2,4- or 3-tert-butyl-2,6-toluenediamine; chlorotoluenediamines; dimethylthio-toluene diamines; 1,2-bis(2-aminophenylthio)ethane, trimethylene glycol di-p-aminobenzoate; tert-amyl toluenediamines, such as 5-tert-amyl-2,4- and 3-tert-amyl-2,6-toluenediamine; tetramethyleneoxide di-p-aminobenzoate; (poly)propyleneoxide di-p-aminobenzoates; chloro diaminobenzoates; methylene dianilines, such as 4,4'-methylene-bis-aniline; isophorone diamine; 1,2-diaminocyclohexane, bis(4-aminocyclohexyl)methane, 4,4'-diaminodiphenyl sulfone, m-phenylenediamine; xylene diamines; 1,3-bis(aminomethyl cyclohexane); and mixtures thereof, preferably, chlorotoluenediamines or dimethylthiotoluene diamines, such as dimethylthiotoluenediamine (DMTDA).

9. In accordance with the chemical mechanical polishing pad of the present invention as in any one of items 5, 6, 7, or 8, above, the polishing pad further comprising a sub pad or backing layer such as a polymer impregnated non-woven, or polymer sheet, onto bottom side of a polishing layer so that the polishing layer forms the top of the polishing pad.

10. In yet another aspect, the present invention provides methods for making chemical mechanical (CMP) polishing pads having a polishing layer adapted for polishing a substrate comprising providing the two component reaction mixture as in any one of items A, 1, 2, 3 or 4, above, mixing the (i) aromatic isocyanate component and the (ii) polyol component, such as, for example, in a static mixer or an impingement mixer, and applying the reaction mixture as one component to an open mold surface, preferably, having a male topography that forms a female groove pattern in the top surface of a CMP polishing pad, curing the reaction mixture at from ambient temperature to 130° C. to form a molded polyurethane reaction product, for example, initially curing at from ambient temperature to 130° C. for a period of from 1 to 30 minutes, or, preferably, from 30 seconds to 5 minutes, removing the polyurethane reaction product from the mold, and then finally curing at a temperature from 60 to 130° C. for a period of 1 minutes to 16 hours, or preferably from 5 min to 15 minutes.

11. In accordance with the methods of the present invention as in item 10, above, wherein the forming of the polishing pad further comprises stacking a sub pad layer, such as a polymer impregnated non-woven, or porous or non-porous polymer sheet, onto bottom side of a polishing layer so that the polishing layer forms the top surface of the polishing pad.

12. In yet still another aspect, the present invention provides methods of polishing a substrate, comprising: Providing a substrate selected from at least one of a magnetic substrate, an optical substrate and a semiconductor substrate; providing a chemical mechanical (CMP) polishing pad according to any one of items 5 to 9 above; creating dynamic contact between a polishing surface of the polishing layer of the CMP polishing pad and the substrate to polish a surface of the substrate; and, conditioning of the polishing surface of the polishing pad with an abrasive conditioner.

13. In accordance with the methods of the present invention as in item 12, above, wherein the methods form the surface of the CMP polishing pad directly in the mold.

14. In accordance with the methods of the present invention as in item 12, above, wherein the applying the reaction mixture as one component comprises overspraying the mold, followed by the curing to form a polyurethane reaction product, removing the polyurethane reaction product from the mold and then punching or cutting the perimeter of the polyurethane reaction product to the desired diameter of the CMP polishing pad.

In accordance with the both reaction mixtures and the CMP polishing pads of the present invention, the polyurethane reaction product matrix material formed from the reaction mixture of the present invention and comprising the matrix of the CMP polishing pad of the present invention has a tensile modulus of at least 200 MPas or, preferably, at least 240 MPas and an elongation at break of at least 100% (ASTM D412-06a (2006)) or, preferably, at least 130%, or, more preferably 150% or higher.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "ASTM" refers to publications of ASTM International, West Conshohocken, Pa.

As used herein, the term "average number of isocyanate groups" means the weighted average of the number of isocyanate groups in a mixture of aromatic isocyanate compounds. For example, a 50:50 wt. % mix of MDI (2 NCO groups) and an isocyanurate of MDI (considered as having 3 NCO groups) has an average of 2.5 isocyanate groups.

As used herein, the term "elongation to break" is the ratio between changed length after breakage of a test specimen and initial length, and tested in accordance with ASTM D412-06a (2006), "Standard Test Methods for Vulcanized Rubber and Thermoplastic Elastomers—Tension." Unless otherwise indicated, five test specimens were measured and an average of all tested specimens for each analyte sample were reported.

As used herein, the term "hard segment" of a polyurethane reaction product or a raw material from either of the liquid polyol component and liquid aromatic isocyanate component refers to that portion of the indicated reaction mixture which comprises any diol, glycol, diglycol, diamine, triamine or polyamine, diisocyanate, triisocyanate, or reaction product thereof. The "hard segment" thus excludes polyethers or polyglycols, such as polyethylene glycols or polypropylene glycols, or polyoxyethylenes, having three or more ether groups.

As used herein, the term "polyisocyanate" means any isocyanate group containing molecule containing two or more isocyanate groups.

As used herein, the term "polyurethanes" refers to polymerization products from difunctional or polyfunctional isocyanates, e.g. polyetherureas, polyisocyanurates, polyurethanes, polyureas, polyurethaneureas, copolymers thereof and mixtures thereof.

As used herein, the term "reaction mixture" includes any non-reactive additives, such as microelements and any additives to lower the hardness of a polyurethane reaction product in the CMP polishing pad according to ASTM D2240-15 (2015).

As used herein, the term "stoichiometry" of a reaction mixture refers to the ratio of molar equivalents of (free OH+free $NH_2$ groups) to free NCO groups in the reaction mixture.

As used herein, the term "SG" or "specific gravity" refers to the weight/volume ratio of a rectangular cut out of a polishing pad or layer in accordance with the present invention.

As used herein, the term "solids" refers to any materials that remain in the polyurethane reaction product of the present invention; thus, solids include reactive and non-volatile additives that do not volatilize upon cure. Solids exclude water and volatile solvents.

As used herein, unless otherwise indicated, the term "substantially water free" means that a given composition has no added water and that the materials going into the composition have no added water. A reaction mixture that is "substantially water free" can comprise water that is present in the raw materials, in the range of from 50 to 2000 ppm or, preferably, from 50 to 1000 ppm, or can comprise reaction water formed in a condensation reaction or vapor from ambient moisture where the reaction mixture is in use.

As used herein, unless otherwise indicated, the term "viscosity" refers to the viscosity of a given material in neat form (100%) at a given temperature as measured using a rheometer, set at an oscillatory shear rate sweep from 0.1-100 rad/sec in a 50 mm parallel plate geometry with a 100 μm gap.

As used herein, unless otherwise indicated, the term "wt. % NCO" refers to the amount of unreacted or free isocyanate groups a given isocyanate or isocyanate-terminated urethane prepolymerprepolymer composition.

As used herein, the term "wt. %" stands for weight percent.

In accordance with the present invention, a chemical mechanical (CMP) polishing pad has a top polishing surface comprising the reaction product of a reaction mixture of a curative, such as a diamine and a polyfunctional polyol component comprising a polyol having a polyether backbone and having from 5 to 7 hydroxyl groups. Applicants have discovered that such polyols, such as polyether polyols (PO/EO copolymers) which have a functionality of 6 in combination with aromatic diamines can provide CMP polishing pads with having in the polyurethane matrix a tensile modulus of as high as 550 MPa while retaining an elongation at break of 160%. The CMP polishing pads that contain the soft polyols of the present invention enable the provision of CMP polishing pads having both excellent tensile strength and acceptable elongation at break from methods of spraying a reaction mixture onto an open mold and allowing it to cure. The 2-component polyurethane forming reaction mixture of the present invention is liquid and can be mixed in a static mixer or an impingement mixer and sprayed to form a CMP polishing pad. The reaction mixture can comprise a number of diisocyanates, triisocyanates, polyols, and/or polyamines as raw materials for improved formulation flexibility.

In the CMP polishing pads of the present invention, the polyurethane tensile modulus must be satisfied while retaining an elongation-to-break of 100% or greater, preferably 130% or higher, or, more preferably 150% or higher. In the final product CMP pad, including pores and optional fillers or microelements, the tensile elongation should be greater than 50%, more preferably greater than 100% as to prevent breakage during pad handling.

The reaction mixture of the present invention can comprise a very rapid curing composition wherein the aromatic isocyanate component and the polyol component can gel in a gel time as short as 2 seconds. The reaction has to be slow enough that the reaction mixture can be mixed in a static or impingement mixer after combining the two components. The only limit on gel time is that the reaction mixture must react slowly enough so as not to clog the mix head in which it is mixed, and to adequately fill a mold when applying it to the mold surface.

The hard segment of the reaction mixture insures good mechanical properties. The hard segment can be 50 to 65 wt. % of the reaction mixture and can comprise part of both the polyol component and the aromatic isocyanate component. Meanwhile, the long chain nature of the polyol having a polyether backbone and having from 5 to 7 hydroxyl groups enables sufficient flexibility to make a suitably hard CMP polishing pad that provides acceptable defectivity in use.

As part of the hard segment of the reaction mixture, a diisocyanate is preferably methylene diphenyl diisocyanate (MDI), which is less toxic compared to toluene diisocyanate (TDI), or is, preferably, an aromatic isocyanate having an average number of isocyanate groups of up to 2.7. The isocyanate component can comprise a linear isocyanate-terminated urethane prepolymer formed from short chain diols like glycols and diglycols or, preferably, monoethylene glycol (MEG), dipropylene glycol (DPG), or tripropylene glycol (TPG).

Preferably, the aromatic isocyanate component contains only impurity levels of aliphatic isocyanate.

The soft segment of the reaction mixture can comprise difunctional polyether polyols in the amount of up to 10 wt. % of the (ii) polyol component. Suitable soft polyols are PTMEG and PPG. Available examples of PTMEG containing polyols are as follows: Terathane™ 2900, 2000, 1800, 1400, 1000, 650 and 250 from Invista, Wichita, Kans.; Polymeg™ 2900, 2000, 1000, 650 from Lyondell Chemicals, Limerick, Pa.; PolyTHF™ 650, 1000, 2000 from BASF Corporation, Florham Park, N.J. Available examples of PPG containing polyols are as follows: Arcot™ PPG-425, 725, 1000, 1025, 2000, 2025, 3025 and 4000 from Covestro, Pittsburgh, Pa.; Voranol™, Voralux™, and Specflex™ product lines from Dow, Midland, Mich.; Multranol™, Ultracel™, Desmophen™ or Acclaim™ Polyol 12200, 8200, 6300, 4200, 2200, each from Covestro (Leverkusen, Del.).

The soft segment of the reaction mixture also comprises the polyol having a polyether backbone and having from 5 to 7 hydroxyl groups per molecule.

Suitable polyols having a polyether backbone and having from 5 to 7 hydroxyl groups per molecule are available as a VORANOL™ 202 Polyol (Dow) having 5 hydroxyl groups, a number average molecular weight of 590 and a hydroxyl number of 475 mg KOH/g, a MULTRANOL™ 9185 polyol (Dow) having 6 hydroxyl groups, a number average molecular weight of 3,366 and a hydroxyl number of 100 mg KOH/g, or a VORANOL™ 4053 polyol (Dow) having an average of 6.9 hydroxyl groups, a number average molecular weight of 12,420 and a hydroxyl number of 31 mg KOH/g.

The stoichiometry of the reaction mixture of the present invention ranges from (NH+OH):NCO 0.8:1.0 to 1.1:1.0. If stoichiometry ranges above the upper limit, the polyurethane product suffers decreased elongation at break.

The chemical mechanical polishing pads of the present invention comprise a polishing layer which is a homogenous dispersion of a porous polyurethane. Homogeneity is important in achieving consistent polishing pad performance. Accordingly, the reaction mixture of the present invention is chosen so that the resulting pad morphology is stable and easily reproducible. For example, it is often important to control additives such as anti-oxidizing agents, and impurities such as water for consistent manufacturing. Because water reacts with isocyanate to form gaseous carbon dioxide and a weak reaction product relative to urethanes generally, the water concentration can affect the concentration of carbon dioxide bubbles that form pores in the polymeric matrix as well as the overall consistency of the polyurethane reaction product. Isocyanate reaction with adventitious water also reduces the available isocyanate for reacting with chain extender, so changing the stoichiometry along with level of crosslinking (if there is an excess of isocyanate groups) and tends to lower resulting polymer molecular weight. To reduce the variability of water's impact to the polyurethane, the water content in the raw materials in monitored and adjusted to a specific value, from 0 ppm to 1000 ppm; preferably from 50 ppm to 500 ppm.

The curative of the present invention may comprise from 5 to 20 wt. %, or, preferably, from 10 to 20 wt. %, or more preferably 13-17 wt. %, based on the total solids weight of the reaction mixture.

Suitable curatives are aromatic amines. However, the curatives must be slow enough to allow the mixing of two component reaction mixture. The curatives must, when combined with the aromatic isocyanate component and the polyol component, cause gelling (so the reactive mixture combination no longer flows) of at least 2 seconds, or, preferably, at least 3-5 seconds. Accordingly, the curatives of the present invention do not comprise more than 10 wt. %, as solids, of N,N-primary alkylaryl diamines, but may comprise N,N-secondary or tertiary alkyl diamines.

To increase the reactivity of the polyol component with the diisocyanate or polyisocyanate, a catalyst may be used. Suitable catalysts include any known catalysts to those skilled in the art, for example, oleic acid, azelaic acid, dibutyltindilaurate, tin octoate, bismuth octoate, 1,8-diazabicyclo[5.4.0]undec-7-ene (DBU), tertiary amine catalysts, such as Dabco™ TMR catalyst, triethylenediamine, such as DABCO™ 33 LV, and mixtures of the above.

The reaction mixture of the present invention is substantially free of water and added organic solvents.

The specific gravity of the resulting CMP polishing pad ranges from 1.17 down to 0.5, preferably, from 0.7 to 1.0. As porosity increases, the bulk properties of the CMP polishing pad diminish, removal rate (RR) goes up, but planarization efficiency (PE) goes down.

Porosity is introduced into the pad by spraying and the resulting tensile modulus of the pad is a function of both the intrinsic polymer tensile modulus and the porosity, and increasing porosity acts to reduce the bulk modulus. Typical densities acquired on a 2-component spray manufacture platform range from 0.5 g/mL to 1.17 g/mL, and more typically 0.6 g/mL to 0.8 g/mL. Thus, for a 2-component spray manufactured pad to deliver acceptable tensile modulus, the polymer matrix tensile modulus has to be acceptably high, preferably greater than 344 MPa, and more preferably greater than 482 MPa.

Polishing pad density is as measured according to ASTM D1622-08 (2008). Density is the same as specific gravity.

The CMP polishing pads of the present invention are formed by a spray application method which enables higher throughput and lower cost. To perform well for in the application space of inter-layer dielectric (ILD) with good planarization efficiency the pad must have acceptable tensile modulus. Preferably the tensile modulus of the CMP polishing pad, rather than the polyurethane or bulk polymer matrix, is above 68 MPa, more preferably over 137 MPa, even more preferably over 206 MPa or yet even 275 MPa.

Preferably, the target or substrate in the methods of the present invention is a mold wherein the produced pad will have groove pattern directly incorporated.

The CMP polishing pads of the invention are efficacious for interlayer dielectric (ILD) and inorganic oxide polishing. For purposes of the specification, the removal rate refers to the removal rate as expressed in A/min.

For purposes of this specification, the formulations are expressed in wt. %, unless specifically noted otherwise.

The chemical mechanical polishing pads of the present invention can comprise just a polishing layer of the polyurethane reaction product or the polishing layer stacked on a subpad or sub layer. The polishing pad or, in the case of stacked pads, the polishing layer of the polishing pad of the present invention is useful in both porous and non-porous or unfilled configurations.

Preferably, the polishing layer used in the chemical mechanical polishing pad of the present invention has an average thickness of from 500 to 3750 microns (20 to 150 mils), or, more preferably, from 750 to 3150 microns (30 to 125 mils), or, still more preferably, from 1000 to 3000 microns (40 to 120 mils), or, most preferably, from 1250 to 2500 microns (50 to 100 mils).

The chemical mechanical polishing pad of the present invention optionally further comprises at least one additional layer interfaced with the polishing layer. Preferably, the chemical mechanical polishing pad optionally further comprises a compressible sub pad or base layer adhered to the polishing layer. The compressible base layer preferably improves conformance of the polishing layer to the surface of the substrate being polished.

The polishing layer of the chemical mechanical polishing pad of the present invention has a polishing surface adapted for polishing the substrate. Preferably, the polishing surface has macrotexture selected from at least one of perforations and grooves. Perforations can extend from the polishing surface part way or all the way through the thickness of the polishing layer.

Preferably, grooves are arranged on the polishing surface such that upon rotation of the chemical mechanical polishing pad during polishing, at least one groove sweeps over the surface of the substrate being polished.

Preferably, the polishing layer of the chemical mechanical polishing pad of the present invention has a polishing surface adapted for polishing the substrate, wherein the polishing surface has a macrotexture comprising a groove pattern formed therein and chosen from curved grooves, linear grooves, perforations and combinations thereof. Preferably, the groove pattern comprises a plurality of grooves. More preferably, the groove pattern is selected from a groove design, such as one selected from the group consisting of concentric grooves (which may be circular or spiral), curved grooves, cross hatch grooves (e.g., arranged as an X-Y grid across the pad surface), other regular designs (e.g., hexagons, triangles), tire tread type patterns, irregular designs (e.g., fractal patterns), and combinations thereof. More preferably, the groove design is selected from the group consisting of random grooves, concentric grooves, spiral grooves, cross-hatched grooves, X-Y grid grooves, hexagonal grooves, triangular grooves, fractal grooves and combinations thereof. Most preferably, the polishing surface has a spiral groove pattern formed therein. The groove profile is preferably selected from rectangular with straight side walls or the groove cross section may be "V" shaped, "U" shaped, saw-tooth, and combinations thereof.

In accordance with the methods of making polishing pads in accordance with the present invention, chemical mechanical polishing pads can be molded with a macrotexture or groove pattern in their polishing surface to promote slurry flow and to remove polishing debris from the pad-wafer interface. Such grooves may be formed in the polishing surface of the polishing pad from the shape of the mold surface, i.e. where the mold has a female topographic version of the macrotexture.

The chemical mechanical polishing pad of the present invention can be used for polishing a substrate selected from at least one of a magnetic substrate, an optical substrate and a semiconductor substrate.

Preferably, the method of polishing a substrate of the present invention, comprises: providing a substrate selected from at least one of a magnetic substrate, an optical substrate and a semiconductor substrate (preferably a semiconductor substrate, such as a semiconductor wafer); providing a chemical mechanical polishing pad according to the present invention; creating dynamic contact between a polishing surface of the polishing layer and the substrate to polish a surface of the substrate; and, conditioning of the polishing surface with an abrasive conditioner.

Conditioning the polishing pad comprises bringing a conditioning disk into contact with the polishing surface either during intermittent breaks in the CMP process when polishing is paused ("ex situ"), or while the CMP process is underway ("in situ"). The conditioning disk has a rough conditioning surface typically comprised of imbedded diamond points that cut microscopic furrows into the pad surface, both abrading and plowing the pad material and renewing the polishing texture. Typically the conditioning disk is rotated in a position that is fixed with respect to the axis of rotation of the polishing pad, and sweeps out an annular conditioning region as the polishing pad is rotated.

EXAMPLES

The present invention will now be described in detail in the following, non-limiting Examples:

Unless otherwise stated all temperatures are room temperature (21-23° C.) and all pressures are atmospheric pressure (~760 mm Hg or 101 kPa).

Notwithstanding other raw materials disclosed below, the following raw materials were used in the Examples:

Ethacure™ 300 curative: Dimethylthiotoluenediamine (DMTDA), an aromatic diamine (Albemarle, Charlotte, N.C.).

Voranol™ V5055HH polyol: Multifunctional polyether polyol (OH Eq. wt 2000), high molecular weight ethylene oxide capped propylene oxide polyol with functionality=6 having a number average molecular weight, $M_N$, of 12,000 (The Dow Chemical Company, Midland, Mich. (Dow)).

MDI prepolymer: A linear isocyanate-terminated urethane prepolymer from MDI and the small molecules dipropylene glycol (DPG) and tripropylene glycol (TPG), with ~23 wt. % NCO content and equivalent weight of 182. 100 wt. % of this MDI prepolymer is treated as hard segment.

Niax™ L5345 surfactant: A non-ionic organosilicon surfactant (Momentive, Columbus, Ohio).

DABCO 33 LV amine catalyst (Air Products, Allentown, Pa.) made from diazobicyclononane (triethylene diamine), DABCO 33 LV is a blend of 33 wt. % triethylene diamine and 67 wt. % dipropylene glycol.

Unilink™ 4200 curative: N,N'-dialkylamino-diphenylmethane (Dorf Ketal, Stafford, Tex.)

PTMEG####: poly(THF) or polytetramethylene glycol, made via the ring-open polymerization of tetrahydrofuran (THF), and sold as PolyTHF™ polyol (BASF, Leverkusen, Del.). The number following PTMEG is the average molecular weight as reported by the manufacturer.

2-Component Air Spray System:

An axial mixing device (a MicroLine 45 CSM, Hennecke GmbH, Sankt Augustin, Del.) having a (P) side liquid feed port, an (I) side liquid feed port and four tangential pressurized gas feed ports. The poly side (P) liquid component and the iso side (I) liquid component were fed to the axial mixing device through their respective feed ports with a (P) side charge pressure of 16,500-18,500 kPa, an (I) side charge pressure of 15,500-17,500 kPa. The flow ratio of (I)/(P) is defined in each example. The pressurized gas was fed through the tangential pressurized gas feed ports with a supply pressure of 830 kPa to give a combined liquid component to gas mass flow rate ratio through the axial mixing device of 3.7:1 to form a combination. The combination was discharged from the axial mixing device toward a mold to form a cake on the mold base.

The following abbreviations appear in the Examples:

PO: propylene oxide/glycol; EO: ethylene oxide/glycol; MDI: methylene diphenyl diisocyanate TDI: toluene diisocyanate (~80% 2,4 isomer, ~20% 2,6 isomer); DEG: diethylene glycol; DPG: dipropylene glycol; pbw: parts by weight.

Comparative Example 1

In a mix cup, 97.91 g of a PTMEG with functionality=2, equiv wt=500 (BASF product PTMEG1000) was combined with 2.50 g Niax™ L5345 surfactant and 35.08 g Ethacure™ 300 curative and 3.39 g monoethylene glycol. To this mixed and degassed liquid, 121.27 g of MDI prepolymer with 23 wt. % NCO and equivalent weight of 182 was added. The cup contents were then mixed with a vortex mixer for 30 seconds and then poured into a mold to cast a plaque and cured at 100° C. for 16 hours. The formulation is described as having 62 wt. % hard-segment weight fraction, with a 0.95:1.0 stoichiometry, containing 13.5 wt. % Ethacure 300 curative. The hydroxyl content is 96.6 wt. % PTMEG1000. After curing, the plaque with density of 1.16 g/mL exhibited a 313 MPa tensile modulus, 49 MPa tensile strength, and 330% tensile elongation.

Comparative Example 2

A 2-component air spray system was employed to spray a 1-shot polyurethane into an open mold. The polyurethane chemistry was identical to that reported in Comparative Example 1. The isocyanate component tank (iso side) was loaded with MDI prepolymer, while the polyol component tank was loaded with all other components (35.2 pbw PTMEG1000, 1.22 pbw monoethylene glycol, 0.90 pbw Niax™ L5345 surfactant, 12.63pbw Ethacure™ 300 curative, and 0.281 pbw DABCO™ 33LV catalyst) at the identical mass ratios as described in Comparative Example 1 with added tertiary amine catalyst to enhance kinetics of curing. The flow rates during spraying were 4.5 g/s for the polyol side and 3.92 g/s for the isocyanate side. The air injected into the nozzle was set to a nominal rate of 100 L/min. The sprayed polyurethane formulation was directed into a mold with groove topography. The sprayed pad was cured in a 100° C. oven for 10 min, then removed from the mold and cured in a 100° C. oven for 16 hours. The resulting pad contained both radial and concentric circular grooves. The resulting pad produced displayed a bulk density of 0.710 g/mL and displayed a bulk tensile modulus of 142 MPa and 228% tensile elongation. Pore size distribution for this pad was relatively narrow, and did not contain a significant quantity of pores over 100 microns.

Comparative Example 3

In the same trial as reported in Comparative Example 2, the air injected into the nozzle was set to nominally 20 L/min. The sprayed polyurethane formulation was directed into a mold with groove features. The sprayed pad was cured in a 100° C. oven for 10 min, then removed from the mold and cured in a 100° C. oven for 16 hours. The resulting pad contained both radial and concentric circular grooves. The resulting pad produced displayed a bulk density of 0.920 g/mL and displayed a bulk tensile modulus of 217 MPa and 172% tensile elongation. Pore size distribution for this pad was broad, and contained significant quantity of pores over 100 microns.

Comparative Example 4

A 2-component air spray system was employed to spray a 1-shot polyurethane into an open mold. The polyurethane chemistry consisted of the MDI prepolymer on the iso side. The polyol side consisted of a blend of 66.9 wt % PTMEG 2000, 31.4 wt % Ethacure™ 300 curative, and 1.7 wt % non-ionic surfactant NIAX™ L5345 surfactant. The flow rates during spraying were 4.57 g/s for the polyol side and 3.15 g/s for the iso side. The air injected into the nozzle was set to a nominal rate of 100 L/min. The sprayed polyurethane formulation was directed into a mold with groove features. The sprayed pad was cured in a 100° C. oven for 10 min, then removed from the mold and cured in a 100° C. oven for 16 hours. The resulting pad contained both radial and concentric circular grooves. The resulting pad produced displayed a bulk density of 0.790 g/mL and displayed a bulk tensile modulus of 151 MPa and 160% tensile elongation. Pore size distribution for this pad was relatively narrow, and did not contain a significant quantity of pores over 100 microns.

Example 5

In a mix cup, 86.85 g of Voranol™ V5055HH polyol (equiv wt=1900) was combined with 2.50 g Niax™ L5345 surfactant and 39.70 g Ethacure™ 300 curative and 10.65 g DPG. To this mixed and degassed liquid, 110.30 g of MDI prepolymer was added. The cup was then mixed with a vortex mixer for 30 seconds and then poured into a mold to cast a plaque and cured at 100° C. for 16 hours. The formulation is described as having 60 wt. % hard-segment weight fraction, with a stoichiometry of 0.95:1.0, containing 15.88 wt. % curative. The hydroxyl content is 89.1% poly-functional polyol and 10.9 wt. % DPG. After curing, the plaque with density of 1.16 g/mL showed 530 MPa tensile modulus, 39 MPa tensile strength, and 160% tensile elongation.

Example 6

A 2-component air spray system was employed to spray 1-shot polyurethane into a mold. The polyurethane chemistry was identical to that reported in Comparative Example 5. The iso tank was loaded with MDI prepolymer, while the poly tank was loaded with all other components (49.69 pbw Voranol 5055HH, 6.09 pbw dipropylene glycol, 1.43 pbw Niax™ L5345 surfactant, 22.71 pbw Ethacure™ 300, 0.43 pbw DABCO™ 33LV) at the identical mass ratios as described in Example 4. The flow rates during spraying were 4.82 g/s for the polyol side and 3.78 g/s for the iso side. The air injected into the nozzle was set to a nominal rate of 100 L/min. The sprayed polyurethane formulation was directed into a mold with groove features. The sprayed pad was cured in a 100° C. oven for 10 min, then removed from the mold and cured in a 100° C. oven for 16 hours. The resulting pad contained both radial and concentric circular grooves. The resulting pad produced displayed a bulk density of 0.753 g/mL and displayed a bulk tensile modulus of 208 MPa, and 115% tensile elongation. Pore size distribution for this pad was relatively narrow, and did not contain a significant quantity of pores over 100 microns.

Example 7

In the same trial as reported in Example 6, the air injected into the nozzle was decreased to nominally 20 L/min. The sprayed polyurethane formulation was directed into a mold with groove features. The sprayed pad was cured in a 100° C. oven for 10 min, then removed from the mold and cured in a 100° C. oven for 16 hours. The resulting pad contained both radial and concentric circular grooves. The resulting pad produced displayed a bulk density of 0.932 g/mL and displayed a bulk tensile modulus of 266 MPa and, and 86% tensile elongation. Pore size distribution for this pad was broad, and contained significant quantity of pores over 100 microns.

The properties of the materials and pads in the Examples, above, are reported in Table 1, below. The pads made in the Examples, above, were tested as set forth in the test methods, below, and the results are reported in Table 2, below.

TABLE 1

Properties of Pads and Plaques

| Example | Polyol | Nozzle air flow (L/min) | Density (g/mL) | Tensile Modulus (MPa) | Tensile Elongation (%) | Pore Size Distribution |
|---|---|---|---|---|---|---|
| CE1 | PTMEG1000 | NA | 1.16 | 310 | 330 | NA[1] |
| CE2 | PTMEG1000 | 100 | 0.710 | 142 | 228 | good |
| CE3 | PTMEG1000 | 20 | 0.920 | 217 | 172 | poor |
| CE4 | PTMEG2000 | 100 | 0.790 | 151 | 160 | good |
| 5 | Voranol 5055HH | NA | 1.16 | 530 | 160 | NA[1] |
| 6 | Voranol 5055HH | 100 | 0.753 | 208 | 115 | good |
| 7 | Voranol 5055HH | 20 | 0.932 | 267 | 86 | poor |

[1]Plaque or cast sheet

Test Methods:

Polishing experiments were conducted on the indicated tetraethoxysilicate (TEOS) wafer substrate with the pad produced in Comparative Example 4, the pad produced in Example 6, and a commercially available IC1000™ polishing pad with K7 R32 groove pattern (Dow). The polishing pad as produced was first machined flat on a lathe to provide a polishing layer. The polishing layer was then stacked onto a SUBA™ IV subpad (Dow) via pressure sensitive adhesive. The final stacked pad was 508 mm in diameter wherein the polishing layer was nominally 2.0 mm thick and featured a mold-replicated groove pattern wherein the plurality of grooves featured a K7-R32 groove pattern with concentric circular grooves 0.50 mm wide, 0.76 mm deep, and at a 1.78 mm pitch, and with 32 radial grooves.

The pad was mounted to the platen of an 200 mm Mirra™ polisher (Applied Materials, Santa Clara, Calif.). Polishing experiments were performed with a downforce of 0.010, 0.020, and 0.030 MPa, a slurry flow rate of 200 mL/min (ILD3225™ fumed silica slurry, Nitta Haas, Japan), a table rotation speed of 93 rpm and a carrier rotation speed of 87 rpm. For polishing experiments with Examples 9, 10, 11 a Klebosol™ 1730 silica slurry (Dow) was employed. A Saesol™ AM02BSL8031C1 diamond pad conditioner (Saesol Diamond Ind. Co., Ltd., South Korea) was used to condition and texture the polishing pads. The polishing pads were each broken in with the conditioner and deionized (DI) water only using a down force of 31.1 N for 40 min. The polishing pads were further conditioned in situ during polishing at 10 sweeps/min from 43 to 233 mm from the center of the polishing pad with a down force of 31.1 N. The Removal Rates (RR) for the indicated pad were determined by measuring the film thickness of the indicated substrate before and after polishing using a FX200™ metrology tool (KLA-Tencor, Milpitas, Calif.) using a 49 point spiral scan with a 3 mm edge exclusion. Removal rate was calculated by the change in thickness from a 49 point spiral scan across the wafer substrate, reported in Angstroms/min.

Non-Uniformity Ratio (% NUR) was calculated by % standard deviation of the removal rates.

Planarization efficiency (PE) was calculated from a polishing run with MIT-SKW7 patterned TEOS wafers (purchased from SKW Associates, Inc. of Santa Clara, Calif.) with downforce at 0.03 MPa. Wafers were periodically removed during the polishing run and analyzed using a SP2™ wafer inspection tool (KLA-Tencor) to measure the wafer features. Planarization efficiency for a given feature step height is calculated by $1-RR_{low}/RR_{high}$ and is desirably as high a percentage as possible. The planarization efficiency ratio was calculated by integrating under the curve of planarization efficiency vs. step height and dividing the result by the initial step height. % planarization efficiency is provided for the 80 nm pitch feature on the wafer substrate.

Defectivity was determined using a SP2 XP™ and eDR5210™ scanning electron microscope wafer defect review system (KLA-Tencor). Categorization of defect type was performed manually from a randomly selected set of 100 defects using Klarity Defect™ software. Defects were categorized, as follows:

A—anything the computer sees; and,
B—Chattermark scratches as identified by visual inspection by trained personnel.

TABLE 2

| | Pad Performance | | | | |
|---|---|---|---|---|---|
| Pad | TEOS Removal Rate (Å/min) | Non-Uniformity Ratio (% NUR) | Planarization Efficiency (% at 80 nm pitch) | A-Total Defect Count (N) | B-Chattermark Count (N) |
| IC1000 | | | | | |
| 1.5 psi | 1439 | 7.2% | — | 143 | 77 |
| 3.0 psi | 2650 | 2.7% | — | 173 | 38 |
| 4.5 psi | 3869 | 2.9% | 88.4% | 102 | 50 |

TABLE 2-continued

| | Pad Performance | | | | |
|---|---|---|---|---|---|
| Pad | TEOS Removal Rate (Å/min) | Non-Uniformity Ratio (% NUR) | Planarization Efficiency (% at 80 nm pitch) | A-Total Defect Count (N) | B-Chattermark Count (N) |
| C.E. 4 | | | | | |
| 1.5 psi | 1139 | 4.1% | — | — | — |
| 3.0 psi | 2298 | 1.9% | — | — | — |
| 4.5 psi | 3304 | 1.7% | 74.7% | — | — |
| Example 6 | | | | | |
| 1.5 psi | 1453 | 6.5% | — | 105 | 40 |
| 3.0 psi | 2870 | 3.0% | — | 153 | 14 |
| 4.5 psi | 4244 | 2.5% | 84.0% | 135 | 20 |

Example 8

In a mix cup, 97.50 g of Voranol™ 5055HH polyol was combined with 2.50 g Niax™ L5345 surfactant and 38.68 g Ethacure™ 300 curative and 4.80 g monoethylene glycol. To this mixed and degassed liquid, 106.52 g of MDI prepolymer was added. The cup was then mixed with a vortex mixer for 30 seconds and then poured into a mold to cast a plaque and cured at 100° C. for 16 hours. The formulation is described as having 60 wt. % hard-segment weight fraction, with a stoichiometry of 0.95:1.0, containing 15.47 wt. % Ethacure™ 300 curative. The hydroxyl content is 95.3 wt. % Voranol™ V5055HH polyol. After curing, the plaque with density of 1.16 g/mL showed 579 MPa tensile modulus, 41 MPa tensile strength, and 175% tensile elongation.

Example 9

A 2-component air spray system was employed to spray 1-shot polyurethane into a mold. The polyurethane chemistry was identical to that reported in Example 8. The iso tank was loaded MDI prepolymer, while the poly tank was loaded with all other components (33.80 pbw Voranol™ V5055HH polyol, 1.66 pbw monoethylene glycol, 0.867 pbw Niax™ L5345 surfactant, 13.409 pbw Ethacure™ 300 curative, 0.0 pbw DABCO™ 33LV catalyst) at the identical mass ratios as described in Example 8. The flow rates during spraying were 8.63 g/s for the polyol side and 6.37 g/s for the iso side. The air injected into the nozzle was set to a nominal rate of 100 L/min. The sprayed polyurethane formulation was directed into a mold with groove features. The sprayed pad was cured in a 100° C. oven for 15 min, then removed from the mold and cured in a 100° C. oven for 16 hours. The resulting pads contained both radial and concentric circular grooves. The resulting pads produced displayed an average density of 0.754 g/mL and displayed a bulk tensile modulus of 253 MPa, and 123% tensile elongation.

Example 10

A 2-component air spray system was employed to spray 1-shot polyurethane into a mold. The polyurethane chemistry was identical to that reported in Example 8. The iso tank was loaded with MDI prepolymer, while the poly tank was loaded with all other components (33.80 pbw Voranol™ V5055HH polyol, 1.66 pbw monoethylene glycol, 0.867 pbw Niax™ L5345 surfactant, 13.409 pbw Ethacure™ 300 curative, 0.0 pbw DABCO 33LV catalyst) at the identical mass ratios as described in Example 8. The flow rates during spraying were 8.63 g/s for the polyol side and 6.37 g/s for the iso side. The air injected into the nozzle was set to a nominal rate of 40 L/min. The sprayed polyurethane formulation was directed into a mold with groove features. The sprayed pad was cured in a 100° C. oven for 15 min, then removed from the mold and cured in a 100° C. oven for 16 hours. The resulting pads contained both radial and concentric circular grooves. The resulting pads produced displayed an average density of 0.799 g/mL and displayed a bulk tensile modulus of 265 MPa, and 126% tensile elongation.

Example 11

A 2-component air spray system was employed to spray 1-shot polyurethane into a mold. The polyurethane chemistry was identical to that reported in Example 8. The iso tank was loaded with MDI prepolymer, while the poly tank was loaded with all other components (33.80 pbw Voranol™ V5055HH polyol, 1.66 pbw monoethylene glycol, 0.867 pbw Niax™ L5345 surfactant, 13.409 pbw Ethacure™ 300 curative, 0.0 pbw DABCO 33LV catalyst) at the identical mass ratios as described in Example 8. The flow rates during spraying were 8.63 g/s for the polyol side and 6.37 g/s for the iso side. The air injected into the nozzle was set to a nominal rate of 20 L/min. The sprayed polyurethane formulation was directed into a mold with groove features. The sprayed pad was cured in a 100° C. oven for 15 min, then removed from the mold and cured in a 100° C. oven for 16 hours. The resulting pads contained both radial and concentric circular grooves. The resulting pads produced displayed an average density of 0.907 g/mL and displayed a bulk tensile modulus of 300 MPa and 80% tensile elongation.

Example 12

In a mix cup, 95.90 g of Voranol™ V5055HH polyol was combined with 4.10 g polytetramethylene ether glycol (PTMEG) with molecular weight=650 g/mol and functionality=2 and 2.50 g Niax™ L5345 surfactant, 39.59 g Ethacure™ 300 curative and 3.82 g monoethylene glycol. To this mixed and degassed liquid, 106.59 g of MDI prepolymer. The cup was then mixed with a vortex mixer for 30 seconds and then poured into a mold to cast a plaque and cured at 100° C. for 16 hours. The formulation is described as having 60 wt. % hard-segment weight fraction, with a stoichiometry of 0.95:1.0, containing 15.84 wt. % Ethacure™ 300 curative. The hydroxyl content is 92.3 wt. % Voranol™ V5055HH polyol. The polyol content comprised 20 mol % PTMEG650. After curing, the plaque with density of 1.15 g/mL showed 471 MPa tensile modulus, 33.8 MPa tensile strength, and 163% tensile elongation.

The properties of the materials and pads in the Examples 7 to 12, above, are reported in Table 3, below.

TABLE 3

Pad Properties

| Example | Polyol | Nozzle air flow (L/min) | Density (g/mL) | Tensile Modulus (MPa) | Tensile Elongation (%) | Pore Size Distribution |
|---|---|---|---|---|---|---|
| 9 | Voranol ™ 5055HH | 100 | 0.754 | 248 | 123 | — |
| 10 | Voranol ™ 5055HH | 40 | 0.799 | 265 | 126 | — |
| 11 | Voranol ™ 5055HH | 20 | 0.907 | 300 | 80 | — |
| 12 | Voranol ™ 5055HH + 20 mol % PTMEG650 | NA | 1.16 | 471 | 163 | — |

We claim:

1. A polishing pad for polishing a substrate chosen from at least one of a magnetic substrate, an optical substrate and a semiconductor substrate, the polishing pad being formed from spraying a one shot formulation, the one shot formulation being a two component solvent free and substantially water free formulation comprising a liquid aromatic isocyanate component having an unreacted isocyanate (NCO) concentration of from 15 to 40 wt. %, based on the total solids weight of the aromatic isocyanate component, the isocyanate being a linear isocyanate-terminated urethane prepolymer of methylene diphenyl diisocyanate or a methylene diphenyl diisocyanate dimer, 35 to 50 wt. % of a liquid polyol component of a polyol having a polyether backbone and having from 5 to 7 hydroxyl groups per molecule and the liquid polyol forming soft segments, an isocyanate extender and a curative of one or more polyamine or diamine, wherein the reaction mixture comprises 50 to 65 wt. % of hard segment materials, based on the total weight of the reaction mixture, and, further wherein, the stoichiometric ratio of the sum of the total moles of amine ($NH_2$) groups and the total moles of hydroxyl (OH) groups in the reaction mixture to the total moles of unreacted isocyanate (NCO) groups in the reaction mixture ranges from 0.8:1.0 to 1.1:1.0 and wherein the polishing pad has a matrix and the matrix has a tensile modulus of at least 240 MPa and an elongation at break of at least 130%.

2. The polishing pad as claimed in claim 1, wherein the liquid aromatic isocyanate component has an unreacted isocyanate (NCO) concentration of from 17.5 to 35 wt. %, based on the total solids weight of the aromatic isocyanate component.

3. The polishing pad as claimed in claim 1, wherein the liquid aromatic isocyanate component has a hard segment weight fraction of 84 to 100 wt. %.

4. The polishing pad as claimed in claim 1, wherein the liquid polyol component comprises a polyol having a polyether backbone and having 6 hydroxyl groups per molecule.

5. The polishing pad as claimed in claim 1, wherein the curative is one or more aromatic diamine.

6. The polishing pad as claimed in claim 1, wherein the liquid aromatic isocyanate component has a hard segment weight fraction of from 90 to 100 wt. %.

7. The polishing pad as claimed in claim 1, wherein the stoichiometric ratio of the sum of the total moles of amine ($NH_2$) groups and the total moles of hydroxyl (OH) groups in the reaction mixture to the total moles of unreacted isocyanate (NCO) groups in the reaction mixture ranges from 0.85:1.0 to 1.1:1.0.

8. The polishing pad of claim 1 wherein the curative is dimethylthiotoluenediamine.

* * * * *